(12) United States Patent
Coln et al.

(10) Patent No.: US 12,742,689 B2
(45) Date of Patent: Sep. 22, 2026

(54) RESISTIVE THERMOMETER EXCITATION AND CALIBRATION

(71) Applicant: Analog Devices, Inc., Wilmington, MA (US)

(72) Inventors: Michael C.W. Coln, Lexington, MA (US); Phillip Michel Nadeau, Cambridge, MA (US); Qingdong Meng, Belmont, MA (US)

(73) Assignee: Analog Devices, Inc., Wilmington, MA (US)

( * ) Notice: Subject to any disclaimer, the term of this patent is extended or adjusted under 35 U.S.C. 154(b) by 322 days.

(21) Appl. No.: 18/499,514

(22) Filed: Nov. 1, 2023

(65) Prior Publication Data

US 2025/0137853 A1 May 1, 2025

(51) Int. Cl.
*G01K 7/20* (2006.01)
*G01K 1/02* (2021.01)
*G01K 7/18* (2006.01)

(52) U.S. Cl.
CPC ............... *G01K 7/20* (2013.01); *G01K 1/026* (2013.01); *G01K 7/183* (2013.01)

(58) Field of Classification Search
CPC .......... G01K 7/20; G01K 1/026; G01K 7/183; G01K 15/005; G01K 7/16
(Continued)

(56) References Cited

U.S. PATENT DOCUMENTS

2004/0125857 A1* 7/2004 Sprock .................... G01K 7/20 374/185
2004/0199354 A1* 10/2004 Heuer .................. G01F 1/6965 73/204.17

(Continued)

FOREIGN PATENT DOCUMENTS

WO WO-9905480 A1 * 2/1999 .............. G01F 1/84

OTHER PUBLICATIONS

"European Application Serial No. 24210061.8, Extended European Search Report mailed Apr. 4, 2025", 8 pgs.
Mayes, Michael, "Temperature-to-Bits: One IC for All Types, 0.1 Degrees C Conformity", Linear Technology Journal of Analog Innovation, 24(4), (Jan. 2015), 7 pgs.

(Continued)

*Primary Examiner* — Peter J Macchiarolo
*Assistant Examiner* — Mireille S Sadate-Moualeu
(74) *Attorney, Agent, or Firm* — Schwegman Lundberg & Woessner, P.A.

(57) ABSTRACT

Circuitry and measurement approaches are described herein that can be used to reduce or suppress sensitivity to variation of sensor properties or characteristics over time for a respective monolithically integrated resistive temperature sensor. Such measurement approaches can also help to suppress measurement variations between sensors, such as to provide stable temperature measurement characteristics across locations and over time for the respective different temperature measurement sites on or within the integrated circuit package. The approaches described herein can also reduce or suppress sensitivity to variation in excitation source characteristics, such as using a relative indication (e.g., a ratio) of measured signal values corresponding to a respective temperature sensor and a co-integrated reference device. Calibration or absolute temperature measurements can be performed, such as using an off-chip (e.g., off-die or off-package) calibration reference. The off-chip calibration reference can be used to establish calibration data for other measurements.

20 Claims, 7 Drawing Sheets

(58) Field of Classification Search
USPC .......................................................... 374/163
See application file for complete search history.

(56) References Cited

U.S. PATENT DOCUMENTS

2016/0003686 A1* 1/2016 Matsumoto ............. G01F 25/10
374/1
2020/0033284 A1* 1/2020 Ranganathan ....... G01N 27/122
2023/0341274 A1* 10/2023 Perumal ................... G01K 7/16

OTHER PUBLICATIONS

"European Application Serial No. 24210061.8, Response filed Aug. 20, 2025 to Extended European Search Report mailed Apr. 4, 2025", w/ English Claims, 21 pgs.

* cited by examiner

RESISTIVE THERMOMETER EXCITATION AND CALIBRATION

FIELD OF THE DISCLOSURE

This document pertains generally, but not by way of limitation, to resistor-based temperature sensing, and more particularly to excitation and calibration approaches, such as for use with monolithically co-integrated Resistance Temperature Detector (RTD) devices.

BACKGROUND

Various sensing approaches can be used to perform temperature measurement in electrical or electronic systems. Examples of electrical sensors include thermocouple structures or resistive temperature sensors such as resistive temperature detector (RTD) sensors. As an illustration, in applications involving chemical or biological research or processing, a temperature of a reaction vessel may be monitored using an electrically excited sensor. The temperature of the reaction vessel can be regulated or otherwise controlled in response to such monitoring. Use of generally available resistive temperature sensors may present various challenges. For example, such sensors may involve cumbersome calibration procedures to account for individual sensor characteristics or to address variation between sensors, and such sensors may exhibit unwanted measurement drift due to changing characteristics over time. Such drift can occur due to aging or in response to environmental changes. Generally available discrete RTD sensors, for example, are also relatively bulky, which may preclude implementation of large arrays of such sensors in microelectronic devices or packages at "chip scale."

SUMMARY OF THE DISCLOSURE

The present inventors have recognized, among other things, that a resistive temperature sensor, such as a resistive temperature detector (RTD), can be monolithically integrated in a semiconductor integrated circuit. The temperature sensor can be co-integrated with many other similar sensors, to support temperature measurement at different locations across a surface of such an integrated circuit or a corresponding package. As an illustration, monolithically co-integrated resistive temperature sensors can be associated with respective sites on or within an integrated circuit package used for chemical or biological applications involving temperature monitoring or control. For example, such an integrated circuit package can include or define respective reaction sites. Such respective reaction sites can support both temperature monitoring and localized heating. One or more reagents can be flowed to such respective sites, such as using reagents that are temperature responsive (e.g., having reactivity or reaction rates that may be temperature dependent). As an illustration, adjusting a temperature of a respective reaction site can be used to trigger a reaction or control a rate of a reaction at that specific reaction site, such as in a spatially selective or addressable manner.

The present inventors have also recognized, among other things, that use of monolithically co-integrated resistive temperature sensors can benefit from measurement approaches that reduces or suppresses sensitivity to variation of sensor properties or characteristics over time for a respective sensor. Such measurement approaches can also help to suppress measurement variations between sensors, such as to provide stable temperature measurement characteristics across locations and over time for the respective different temperature measurement sites on or within the integrated circuit package. The approaches described herein can also reduce or suppress sensitivity to variation in excitation source characteristics, such as using a relative indication (e.g., a ratio) of measured signal values corresponding to a respective temperature sensor and a co-integrated reference device. Such an approach can be referred to as a "ratio-metric" measurement technique. The co-integrated reference device need not use exotic materials or possess stability characteristics that exceed the stability of the other co-integrated temperature sensors. For example, the co-integrated reference device can have a similar geometry or composition (or both) as compared to a respective temperature sensor, or the co-integrated reference device can even be identical in configuration. Calibration or absolute temperature measurements can be performed, such as using an off-chip (e.g., off-die or off-package) calibration reference.

In an example, a method for localized measurement of temperature can be performed using an integrated temperature sensor circuit, the method comprising: generating an excitation current, routing the excitation current, using switching circuitry, through a first resistive temperature sensor to establish a first sensor signal and, contemporaneously, routing the excitation current through a second resistive temperature sensor to establish a second sensor signal, comparing the first sensor signal and the second sensor signal to establish a relative indication of the first sensor signal with respect to the second sensor signal, and in response, generating a digital representation of the relative indication of the first sensor signal with respect to the second sensor signal.

In an example, an integrated circuit can include an excitation current source, a first resistive temperature sensor, a second resistive temperature sensor, measurement switching circuitry, an analog-to-digital converter (ADC) circuit, and a control circuit. The control circuit is configured to, using the measurement switching circuitry, route an excitation current from the excitation current source through the first resistive temperature sensor to establish a first sensor signal and, contemporaneously, route the excitation current through the second resistive temperature sensor to establish a second sensor signal. The control circuit is configured to, using the measurement switching circuitry, deliver the first sensor signal to a first input of the ADC circuit, and using the measurement switching circuitry, deliver the second sensor signal to a second input of the ADC circuit. The control circuit is configured to generate a digital representation of a relative indication of the first sensor signal with respect to the second sensor signal using the ADC circuit.

In an example, the first resistive temperature sensor and second resistive temperature sensors are monolithically co-integrated on or within a commonly shared substrate of the integrated circuit, the second resistive temperature sensor having a temperature that is different from the first resistive temperature sensor. In an example, a composition and a structure of the first resistive temperature sensor and the second resistive temperature sensor are substantially similar or identical. In an example, the first resistive temperature sensor is included in an array comprising a plurality of resistive temperature sensors. In an example, the second resistive temperature sensor comprises a reference resistive temperature sensor separate from the array.

In an example, an integrated circuit can include an excitation current source, a first resistive temperature sensor, a second resistive temperature sensor, measurement switching circuitry, an analog-to-digital converter (ADC) circuit, and a control circuit, the control circuit configured to determine a measured temperature value corresponding to the first resistive temperature sensor using digital representations of respective voltages established contemporaneously across the first resistive temperature sensor and the second resistive temperature sensor in response to an excitation current provided by the excitation current source, the digital representations obtained using the ADC circuit, and using calibration data indicative of a ratio of resistance values of the first resistive temperature sensor and the second resistive temperature sensor, and indicative of at least first-order temperature coefficients of resistance corresponding to the first resistive temperature sensor and the second resistive temperature sensor, respectively.

This summary is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
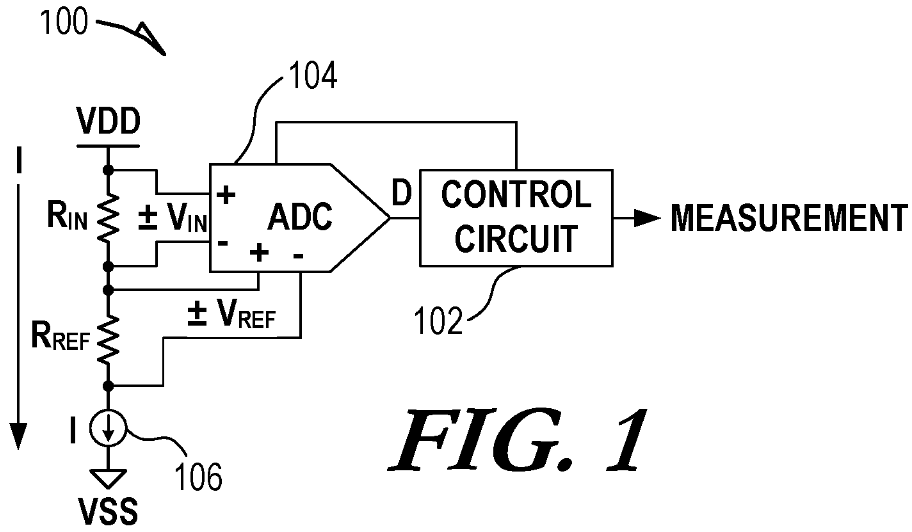
FIG. 1 illustrates generally an example comprising an electronic circuit, such as can be implemented as a monolithic integrated circuit, for performing temperature measurement using a resistive temperature sensor.

Resistive temperature sensors such as RTDs detect temperature by detecting a change in resistance induced by changing temperature. Such a change can be detected by forcing a controlled excitation current through the resistive sensor and measuring a corresponding voltage across the resistive sensor. Assuming the excitation current is constant or known, as the temperature changes, the corresponding sensor resistance changes, and the voltage developed across the sensor varies. From the changes in a measured voltage, the temperature can be determined. Even with well-controlled manufacturing, individual RTDs are generally measured after fabrication to provide calibration data to support a desired measurement accuracy. Perturbations in manufacturing (such as film thickness or lithography variation) from nominal values can affect the absolute resistance of a respective sensor, such as introducing an "offset" in the estimated temperature versus a nominal value. Material composition variations can change a temperature coefficient of resistance (TCR), such as leading to a sensitivity or "slope" error as the temperature being measured changes.

The present subject matter generally relates to circuitry and related techniques (such as machine-implemented or automated methods) for performing temperature measurement using resistive temperature sensors. Such sensors can include monolithically co-integrated resistance-temperature-detectors (RTDs) and use of such monolithically co-integrated sensors can reduce measurement sensitivity to manufacturing variations and can enable calibration of individual sensors. As described herein, the present subject matter can include use of a relative indication of signals (e.g., a ratio or difference in voltages, or another relative indication) established across a respective temperature sensor and a similar reference device, such as where the respective "active" (e.g., selected) sensor and reference device are contemporaneously excited by the same signal (e.g., an excitation current). Use of such an approach can be referred to as a "ratio-metric" approach, where variation or noise associated with the excitation signal (or its corresponding source) can be reduced or suppressed. Calibration coefficients describing respective sensor measurement characteristics can be established without requiring ultra-stable "standard" resistors or other exotic calibration references.

In one approach, such as for a discrete sensor, such a sensor can be calibrated by placing the sensor in an oven, applying known temperatures and temperature changes to the sensor, and determining calibration coefficients or other factors. However, such an approach may present challenges. In the integrated circuit sensor array configuration as shown herein, where a "ratio-metric" measurement technique can be used, establishing a controlled temperature difference or "delta" between an "active" sensor and the similarly fabricated "reference" device may not be feasible when both are monolithically co-integrated. For example, a high thermal conductivity of a semiconductor material may prevent applying accurately known temperature differences between the "active" and "reference" devices. To address such a challenge, the present inventors have also, among other things, developed circuitry and calibration techniques to extract calibration parameters such nominal sensor resistance values, offset values corresponding thereto, or temperature coefficients of resistance. Such a calibration approach can include use of an off-chip (e.g., off-die or even off-package) calibration reference resistor.

FIG. 1 illustrates generally an example comprising an electronic circuit 100, such as can be implemented as a monolithic integrated circuit, for performing temperature measurement using a resistive temperature sensor. The present inventors have recognized, among other things, that resistive temperature sensors such as RTDs provide more accurate temperature measurement when used in a circuit configuration (and with a corresponding measurement technique) that lowers sensitivity to confounding factors such as variations in the excitation source or manufacturing variations in the sensors.

As described herein, a relative indication of a first sensor signal (e.g., a voltage established across the resistive temperature sensor) measured with respect to a second sensor signal (e.g., a voltage established across a reference device) can help to suppress such variations. For example, as shown in FIG. 1, a temperature sensor represented by a resistor $R_{IN}$ can be excited by a current, I, generated by a current source 106, and a corresponding voltage VIN can be developed across $R_{IN}$. The same current, I, can be used to contemporaneously excite a reference device, $R_{REF}$, such as to establish a corresponding reference voltage VREF. A "ratio-metric" measurement can be performed such as by providing VIN and VREF to separate inputs of an analog-to-digital converter (ADC) circuit 104 (such as a sigma-delta analog-to-digital converter circuit). As shown and described in this document, $R_{REF}$ can have a structure and composition that is substantially similar to the temperature sensor represented by $R_{IN}$, but where $R_{REF}$ is at a different location on or within the monolithic integrated circuit (e.g., separated from $R_{IN}$). In general, the reference device represented by $R_{REF}$ is monolithically co-integrated on or within a commonly shared substrate with the temperature sensor represented by $R_{IN}$.

The ADC can generate a digital representation corresponding to an output value, D, of a relative indication of VIN with respect to VREF (e.g., a ratio-metric representation). For example, the output value D can represent a digitally encoded fraction corresponding to a temperature difference between sensors represented by $R_{IN}$ and $R_{REF}$ (though such a representation need not literally be encoded as a decimal fraction). As an illustrative example, many ADC circuits provide a voltage input channel, and a separate reference voltage input. As discussed below, such a ratio-metric representation of differences between voltages across $R_{IN}$ and $R_{REF}$ is largely insensitive to variation in excitation current, I, provided by the current source 106. A control circuit 102 can control one or more portions of the electronic circuit 100, such as performing an automated or semi-automated measurement including applying calibration data to output a measurement indicative of a temperature difference between sensors corresponding to $R_{IN}$ and $R_{REF}$. For example, the control circuit 102 can include a processor circuit or logic such as a state machine to perform techniques shown and described in this document. The control circuit 102 can include or can be communicatively coupled with a memory circuit, such as can store calibration data (e.g., one or more of nominal resistor values, offset values corresponding thereto, or temperature coefficients of resistance, as illustrative examples). Such calibration data can be established during or after fabrication, or in a field use environment using one or more calibration approaches discussed below.

Generally, to a first-order approximation, resistive temperature sensors such as RTDs can be modeled as having a temperature proportional to absolute temperature. Accordingly, a respective sensor device can be modeled as having a temperature coefficient of resistance (TCR). If a sensor resistance is represented by $R_0$ at a temperature $T_0$, a resistance $R_1$ at a temperature $T_1$, and with $(T_1-T_0)=\Delta T$, a relationship can exist where $R_1=R_0+\Delta T*TCR*R_0$. Such a relationship corresponds to $R_1/R_0=1+\Delta T*TCR$. Because the active sensor and reference device can be identically constructed, their respective "$R_0$" values can be modeled as being the same, though as discussed in more detail below, residual differences may exist between individual devices, where such residual differences can be addressed through a calibration process. For purposes of the present discussion, assuming the active sensor and the reference device have the same nominal resistance and configuration, a ratio of the resistances of the active sensor and reference device can be represented as $1+\Delta T*TCR$. This expression is insensitive to variations in the nominal resistance of the sensor devices, including general manufacturing variations that impact all similar sensors, such as due to bulk material properties, thin film thickness, or lithographic imaging and etching perturbations, as illustrative examples. The ADC circuit 104 digital output, D, can be modeled as responsive only to a difference in temperature between the active sensor (e.g., $R_{IN}$) and the reference (e.g., $R_{REF}$), such as having a magnitude proportional to a temperature coefficient of resistance of the material forming the sensor and reference device structures (e.g., an RTD material).

As mentioned elsewhere herein, use of monolithically integrated resistive temperature sensors facilitates co-integration of large counts of sensors (e.g., dozens or hundreds, or more), such as arranged in an array with multiplexer circuitry for routing excitation or measurement signals to respective sensors in an addressable manner to perform localized temperature measurements. Such an approach can be used to support temperature measurements in respective regions or domains corresponding to reaction sites on or within an integrated circuit for chemical or biological evaluation. For example, FIG. 2 illustrates generally an example comprising a system 200, such as defining a plurality (e.g., an array) of temperature measurement regions (e.g., a region 210) comprising respective resistive temperature sensors.

As an illustrative example, the system 200 can define reaction sites forming an array, with corresponding resistive structures monolithically fabricated as a portion of an integrated circuit 224 using processing similar to existing semiconductor integrated fabrication technology, including thin film deposition and photolithographically defined etching. For example, a respective region 210 in the array can include a resistive heater structure. Fabrication techniques and materials to form such a heater structure can be used to fabricate a co-located resistive temperature sensor (e.g., an RTD represented by a resistance $R_A$) to monitor a respective region 210 temperature. The same resistive structure can be used for both heating and temperature sensing, such as in a time-multiplexed manner. As an illustrative example, the system 200 can support temperature measurements as shown and described above in FIG. 1 and elsewhere herein, where co-integrated reference devices (e.g., resistive structures fabricated similarly or identically to respective resistive temperature sensors) can be monolithically co-integrated with the respective resistive temperature sensors on or within the integrated circuit 224. For example, a reference device (represented by a resistance $R_R$) in the region 208 can be shared in a time multiplexed manner with a column of resistive temperature sensors including the respective sensor at the region 210, with measurements performed by a corresponding ADC circuit 204 for the column. Routing of excitation current and measurement signals can be performed using switching, such as provided by one or more multiplexer circuits 222.

As shown and described below in relation to FIG. 4, and FIG. 5A, FIG. 5B, FIG. 5C, and FIG. 5D, various approaches can be used to calibrate (e.g., establish coefficients such as nominal resistances, offsets corresponding thereto, or temperature coefficients of resistance) the resistive sensor and associated reference devices. As shown in FIG. 2, an off-chip (e.g., off-die or off-package) calibration reference resistor (represented by a resistance $R_{OC}$) in the respective region 220 can be coupled to a port 226 (e.g., pads or package "pins") defining interconnection nodes to which the calibration reference resistor can be connected. The calibration reference resistor located off-chip need not be present for all modes of operation and may be exposed to an environment that is different than the integrated circuit 224. Alternatively, or in addition, the calibration reference resistor (represented by resistance $R_{OC}$) can be selected or fabricated to have a flat or nearly flat slope (e.g., corresponding to a zero-valued temperature coefficient of resistance). As an example, the calibration reference resistor may be maintained at a fixed known temperature, or a separate temperature measurement may be performed using an independent temperature measurement apparatus to identify a temperature of the calibration reference resistor. Generally, the off-chip reference resistor can have a specified or measured resistance value that is known or derived and corresponds to a controlled or measured temperature. As few as a single calibration reference resistor can be used to identify calibration coefficient values for an array of integrated resistive temperature sensors and corresponding on-chip reference devices.

Figure 2:
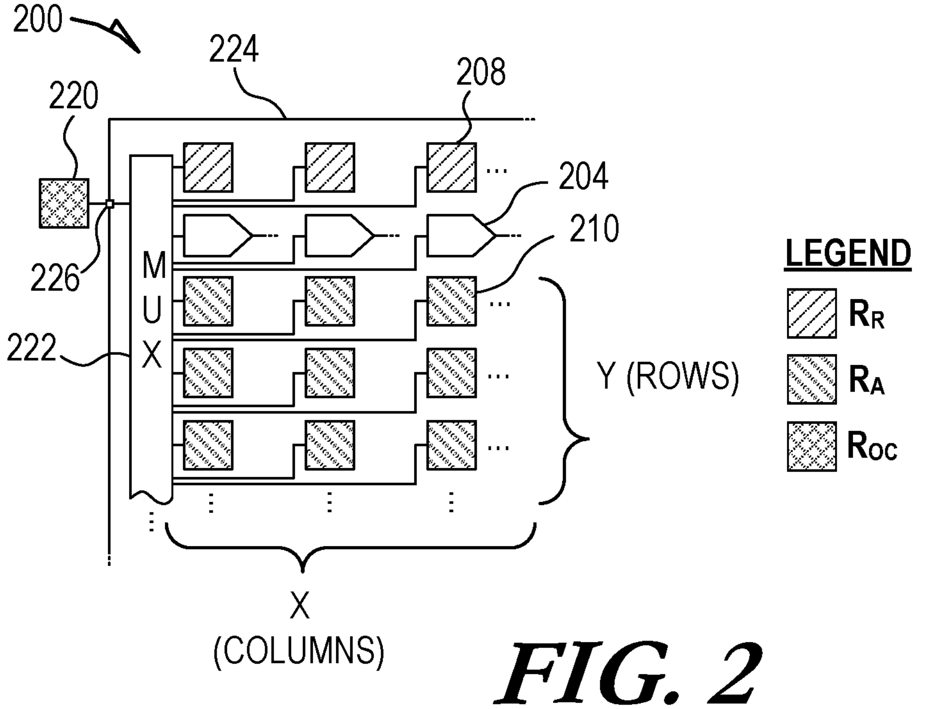
FIG. 2 illustrates generally an example comprising a system, such as defining a plurality (e.g., an array) of temperature measurement regions comprising respective resistive temperature sensors.

As an illustrative example, using the labels shown in FIG. 2, Y can be equal to 16 rows, and X can be equal to 24 columns, providing an array of 384 respective resistive temperature sensors multiplexed to 24 ADC circuits (such as the ADC circuit 204), where 16 resistive temperature sensors are time multiplexed to a respective ADC circuit. A control circuit can control the multiplexer circuit 222 to determine an absolute temperature at each of the resistive sensors, using 24 on-die reference devices, with one reference device per ADC. A location of the reference devices such as the reference device in the region 208 can be outside a footprint of the active resistive temperature sensor array.

Figure 3:
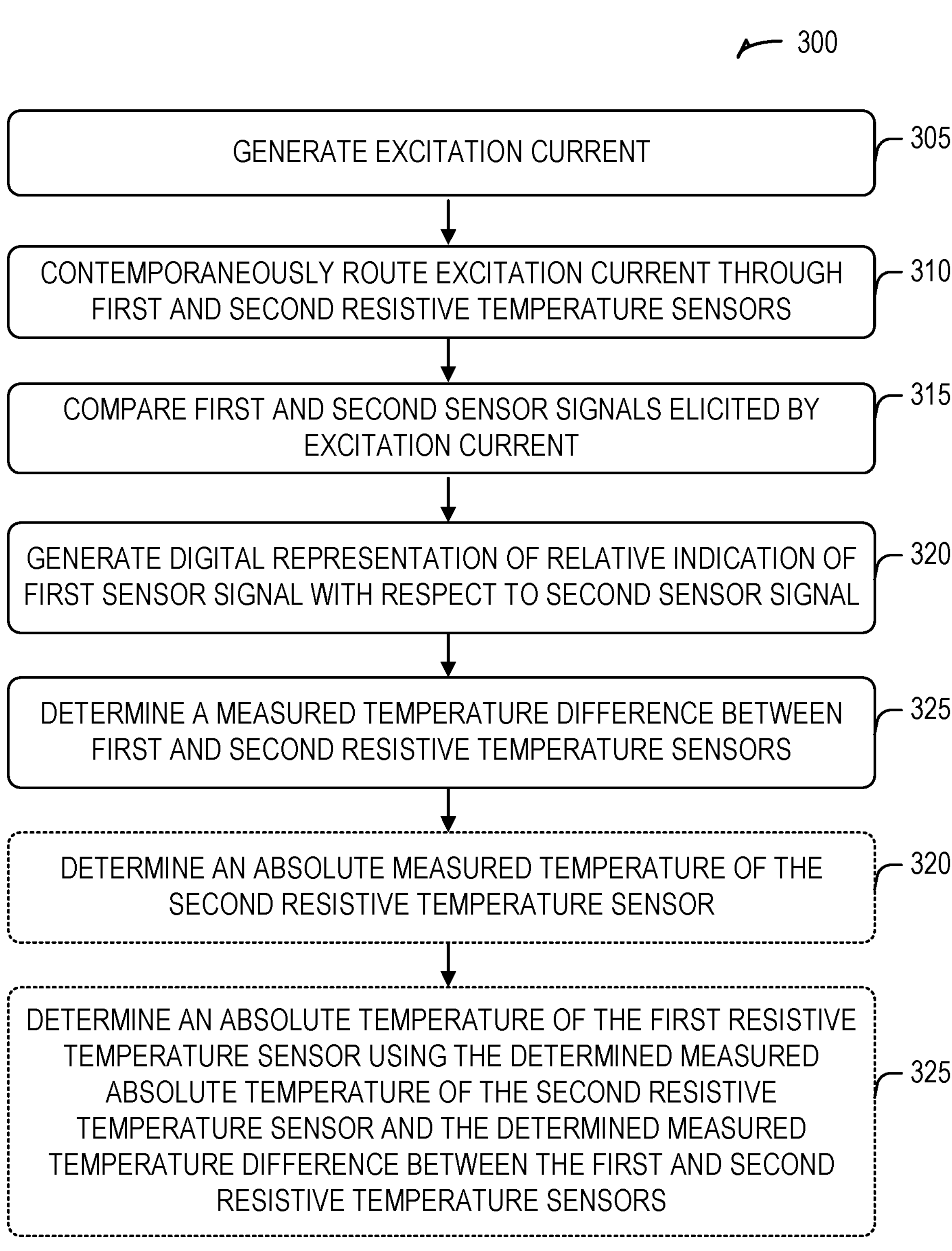
FIG. 3 illustrates generally a technique, such as a circuit-implemented method for performing a temperature determination, such as can include use of an electronic circuit topology as shown illustratively in FIG. 1 as discussed above, or FIG. 5A, as discussed below, and such as can form a portion of a system as shown in FIG. 2.

FIG. 3 illustrates generally a technique 300, such as a circuit-implemented method for performing a temperature determination, such as can include use of an electronic circuit topology as shown illustratively in FIG. 1 as discussed above, or FIG. 5A, as discussed below, and such as can form a portion of a system as shown in FIG. 2. At 305, the technique 300 can include generating an excitation current (e.g., represented as "I"). At 310, the excitation current can be contemporaneously routed through a first resistive temperature sensor and a second resistive temperature sensor. At 315, a first sensor signal elicited by the excitation current flowing through the first resistive temperature sensor can be compared with a second sensor signal elicited by the excitation current flowing through the second resistive temperature sensor. For example, as discussed above, such a comparison can be performed by an analog-to-digital conversion circuit having a signal input and a reference input, where, for example at 320, a digital representation of a relative indication of the first sensor signal is generated with respect to the second sensor signal (e.g., a ratio). Use of a ratio is merely illustrative, and the digital representation need not literally represent a decimal fraction. For example, a digital output D, as mentioned above, may represent a fractional digital code. The following table shows terms for an analytical representation of the digital output.

TABLE 1

| Terms in analytical representation of digital output. | |
|---|---|
| D | Fractional digital code (e.g., without $2^N$ and possibly other scaling factors for simplicity) |
| $R_{IN}$ | Input resistor - either an active thermometer ($R_A$) or on-die reference ($R_R$) |
| $R_{REF}$ | Reference resistor - e.g., an on-die reference ($R_R$) or the off-chip reference ($R_{oc}$) |
| I | Excitation current, common to both resistors |
| $V_{REF}$ | Voltage at the ADC circuit reference port |
| $V_{IN}$ | Voltage at the ADC circuit signal input port |

The digital representation corresponding to an ADC circuit measurement can be represented by the following:

$$D = \frac{V_{IN}}{V_{REF}} = \frac{I \cdot R_{IN}}{I \cdot R_{REF}} = \frac{R_{IN}}{R_{REF}}. \quad \text{EQN. 1}$$

At 325, a measured temperature difference can be determined, such as corresponding to a temperature difference between the first resistive temperature sensor and the second resistive temperature sensor. For example, such a difference can be established using measured calibration data indicative of a temperature coefficient of resistance (TCR) corresponding to the similarly-fabricated co-integrated resistive devices, as shown and described elsewhere herein. Optionally, at 320, an absolute measured temperature of the second resistive temperature sensor can be determined, and at 325, an absolute temperature of the first resistive temperature sensor can be determined using the determined absolute temperature of the second resistive temperature sensor and the measured temperature difference between the first resistive temperature sensor and the second resistive temperature sensor. The absolute measured temperature of the second resistive temperature sensor can be determined using a signal routing similar to that used for calibration as shown and described below but using known calibration coefficients to extract unknown temperature values, rather than vice versa. For example, the absolute temperature of the second resistive temperature sensor (e.g., an on-die reference device) can be based on an off-chip calibration resistor being exposed to a controlled temperature or being at a known temperature.

Figure 4:
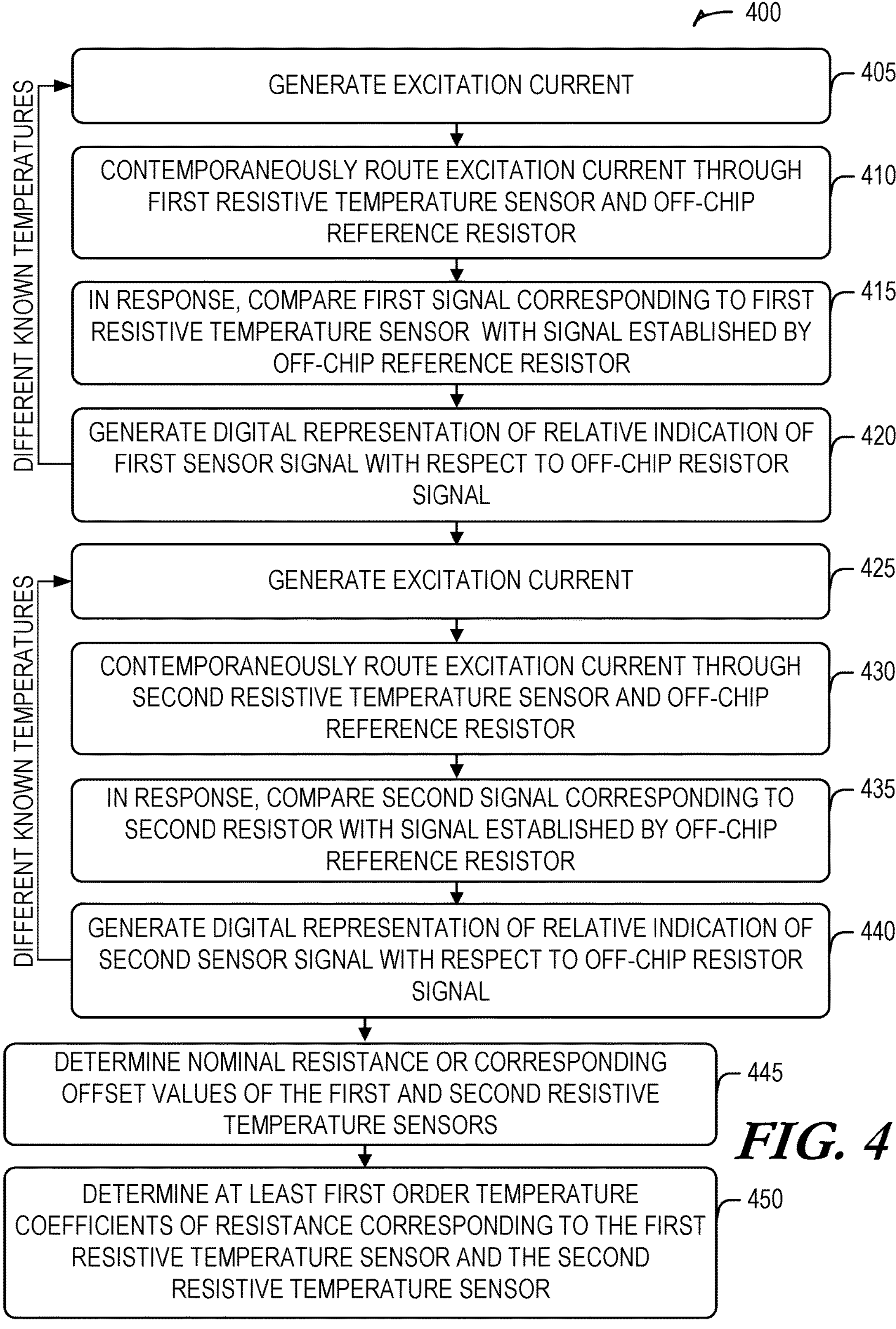
FIG. 4 illustrates generally a technique, such as a circuit-implemented method for performing respective calibration operations, such as can include use of an electronic circuit topology as shown illustratively in FIG. 1 as discussed above, or FIG. 5A, as discussed below, and such as can form a portion of a system as shown in FIG. 2.

FIG. 4 illustrates generally a technique 400, such as a circuit-implemented method for performing respective calibration operations, such as can include use of an electronic circuit topology as shown illustratively in FIG. 1 as discussed above, or FIG. 5A, as discussed below, and such as can form a portion of a system as shown in FIG. 2. Generally, use of a single ratio-metric measurement using the configuration shown in FIG. 1 and described in FIG. 3 may not expose the respective calibration parameters of an active (e.g., selected) temperature sensor and a corresponding reference device. Accordingly, the present inventors have, among other things, established a calibration approach using a third resistive device, such as an off-chip resistor as mentioned above. Use of a third device can facilitate a series of calibration measurements that can be used to unique identify calibration parameters for respective active resistive temperature sensors and reference devices independently.

At 405, an excitation current can be generated, and at 410, the excitation current can be routed through a first resistive temperature sensor and an off-chip reference resistor. For example, the first resistive temperature sensor can be a selected "active" resistive temperature sensor located in an array as discussed above. At 415, in response to the excitation current, a first signal corresponding to the first resistive temperature sensor can be measured and can be compared with a corresponding signal established by the off-chip reference resistor (also in response to the same excitation current). Such a comparison can be similar to the ratio-metric measurement described above but using the off-chip reference resistor instead of a second resistive sensor such as an on-chip reference device. At 420, a digital representation of the relative indication can be generated, such as a fractional digital count. The process defined at 405 through 420 can be repeated for different known exposure temperatures, where an integrated circuit containing the first resistive temperature sensor is exposed to the different known exposure temperatures, such as achieving thermal equilibrium at the respective known exposure temperatures.

A similar procedure can be used for performing measurements on a second resistive temperature sensor (e.g., a reference device having a configuration similar to the first resistive temperature sensor). For example, at 425, an excitation current can be generated, and at 430, the excitation current can be routed through the second resistive temperature sensor and an off-chip reference resistor. At 435, in response to the excitation current, a second signal corresponding to the second resistive temperature sensor can be measured and can be compared with a corresponding signal established by the off-chip reference resistor (also in response to the same excitation current). At 440, a digital representation of the relative indication can be generated, such as a fractional digital count. The process defined at 425 through 440 can be repeated for different known exposure temperatures, where the integrated circuit containing the second resistive temperature sensor is exposed to the different known exposure temperatures. While the process defined at 405 through 420 is shown as occurring serially before the process at 425 through 440, other variations are possible. For example, for time savings, for a particular known temperature, the process at 405 through 420 can be performed, then the process at 425 through 440 (or vice versa), and then the exposure temperature can be changed for measurements at the next known temperature, until measurements have been obtained for all known temperatures.

At 445, a nominal resistance or a corresponding offset value from the nominal resistance can be determined for each of the first and second resistive temperature sensors, such as shown and described below. In addition, or alternatively, at 450, at least a first-order temperature coefficient of resistance (TCR) can be established for each of the first and second resistive temperature sensors.

Generally, using the approach shown in the technique 400 of FIG. 4, the off-chip resistor may be maintained at a fixed temperature, and the temperature of both the active and reference resistive sensors can be varied. As mentioned above, as an alternative (or in addition), an effectively-zero-TCR resistor can be used for the off-chip resistor. Because the off-chip resistor can be substantially unchanging in resistance (either due to being held at a stabilized temperature or due to having a near-zero or zero TCR), the multiple measurement results can independently expose calibration parameters of the active resistive sensors and corresponding reference devices. For example, if TCRs are determined for an active resistive temperature sensor and a corresponding reference device, an effective TCR of the active-versus-reference combination can be derived, corresponding to a "slope" calibration of an on-chip active sensor/reference device pair.

Figure 5A:
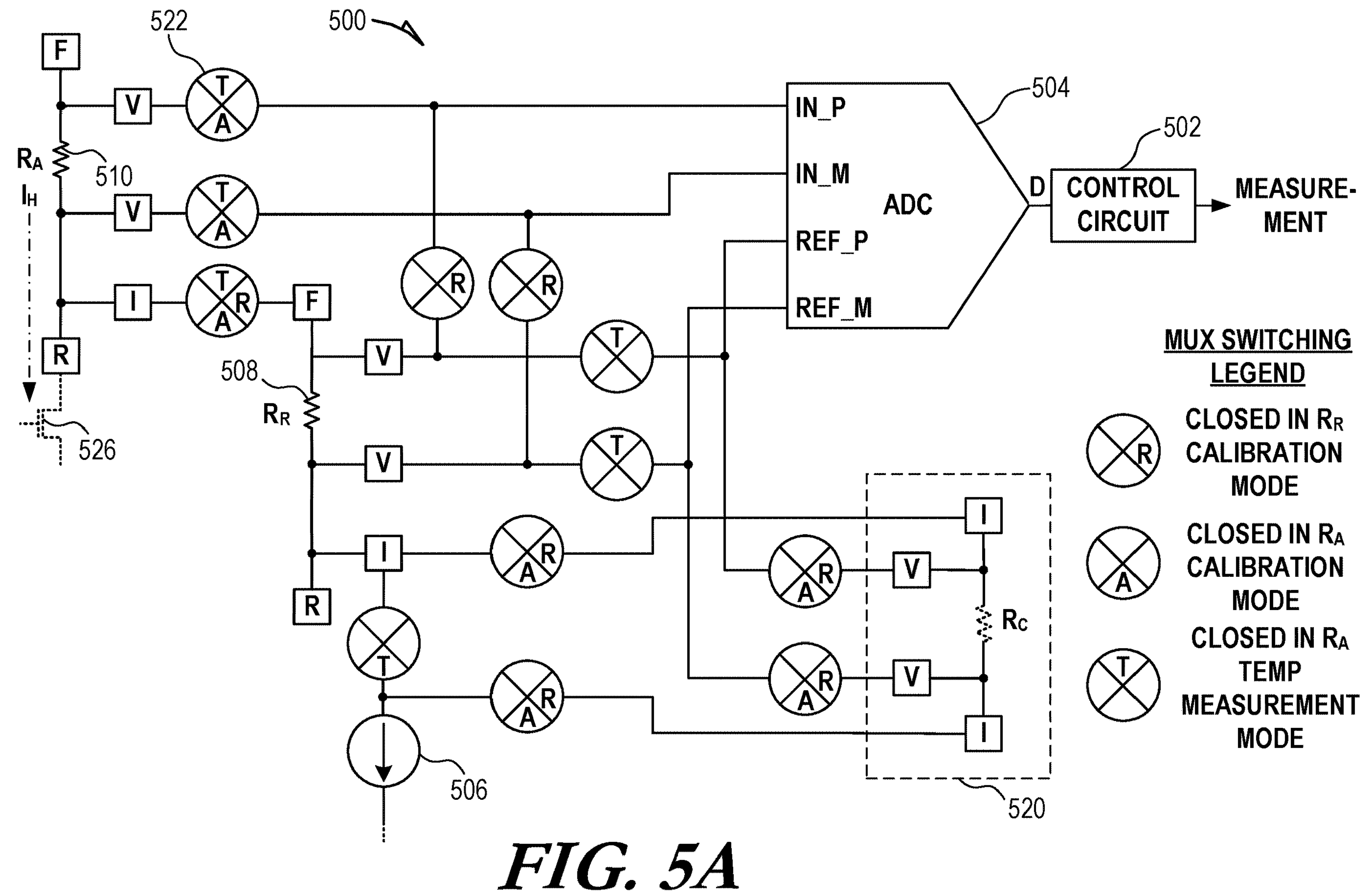
FIG. 5A illustrates generally an example comprising an electronic circuit, such as can include a monolithic integrated circuit comprising resistive temperature sensors, multiplexer circuitry, analog-to-digital conversion circuitry, and a control circuit.

FIG. 5A illustrates generally an example comprising an electronic circuit 500, such as can include a monolithic integrated circuit comprising resistive temperature sensors (e.g., an active resistive temperature sensor 510 represented by $R_A$ and a reference device 508 represented by $R_R$), multiplexer circuitry (such as comprising switching circuitry, represented by circular symbols such as the switch 522), analog-to-digital conversion circuitry (e.g., the ADC circuit 504), and a control circuit 502. The symbols for multiplexing circuitry switches include letters corresponding to operational modes where the corresponding switch is closed. For example, the switch 522 is closed in the $R_A$ temperature measurement mode (see, e.g., FIG. 5D) and in the $R_A$ calibration mode (see, e.g., FIG. 5C). In an example where the active resistive temperature sensor 510 also serves as a heating element, other circuitry such as a switch 526 (e.g., a solid-state transistor switch such as a FET device) can be used to route a heating current, $I_H$, through the active resistive temperature sensor 510 when the active resistive temperature sensor 510 is not being monitored by the ADC circuit 504.

Figure 5B:
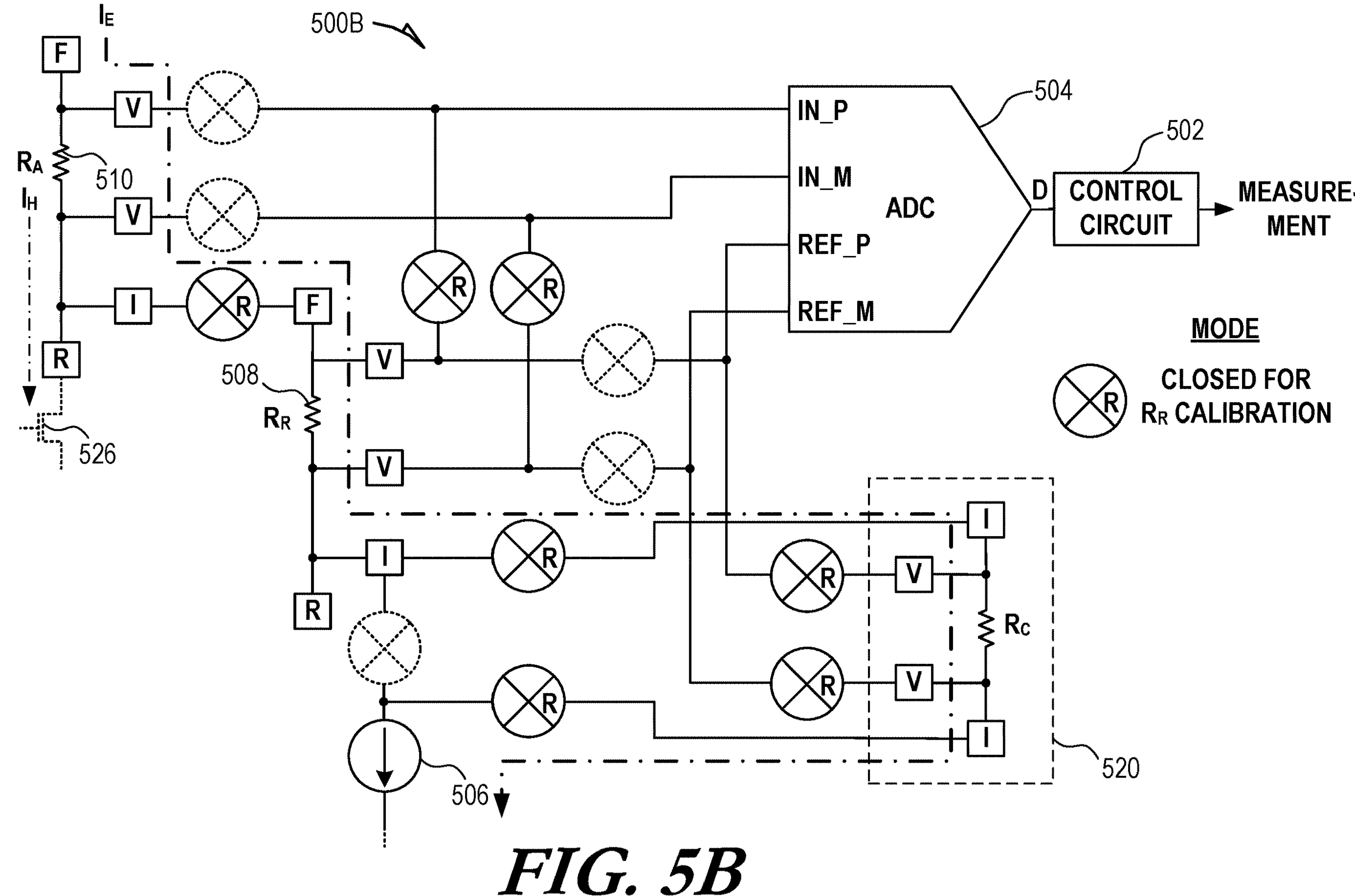
FIG. 5B illustrates generally an example comprising the electronic circuit of FIG. 5A configured in an $R_A$ calibration mode, such as can include use of an off-chip reference resistor.
Figure 5C:
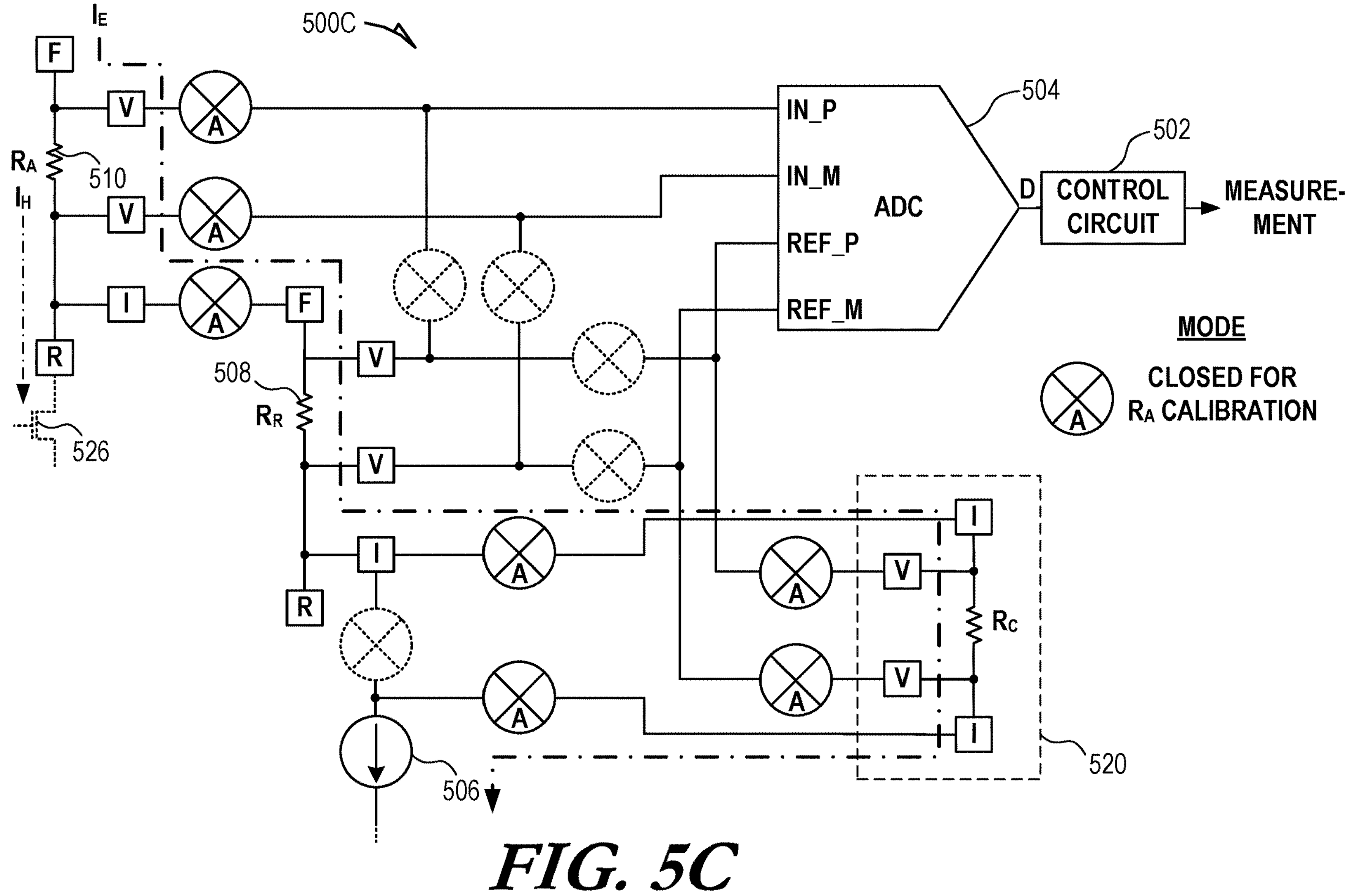
FIG. 5C illustrates generally an example comprising the electronic circuit of FIG. 5A configured in an $R_R$ calibration mode, such as can include use of an off-chip reference resistor.
Figure 5D:
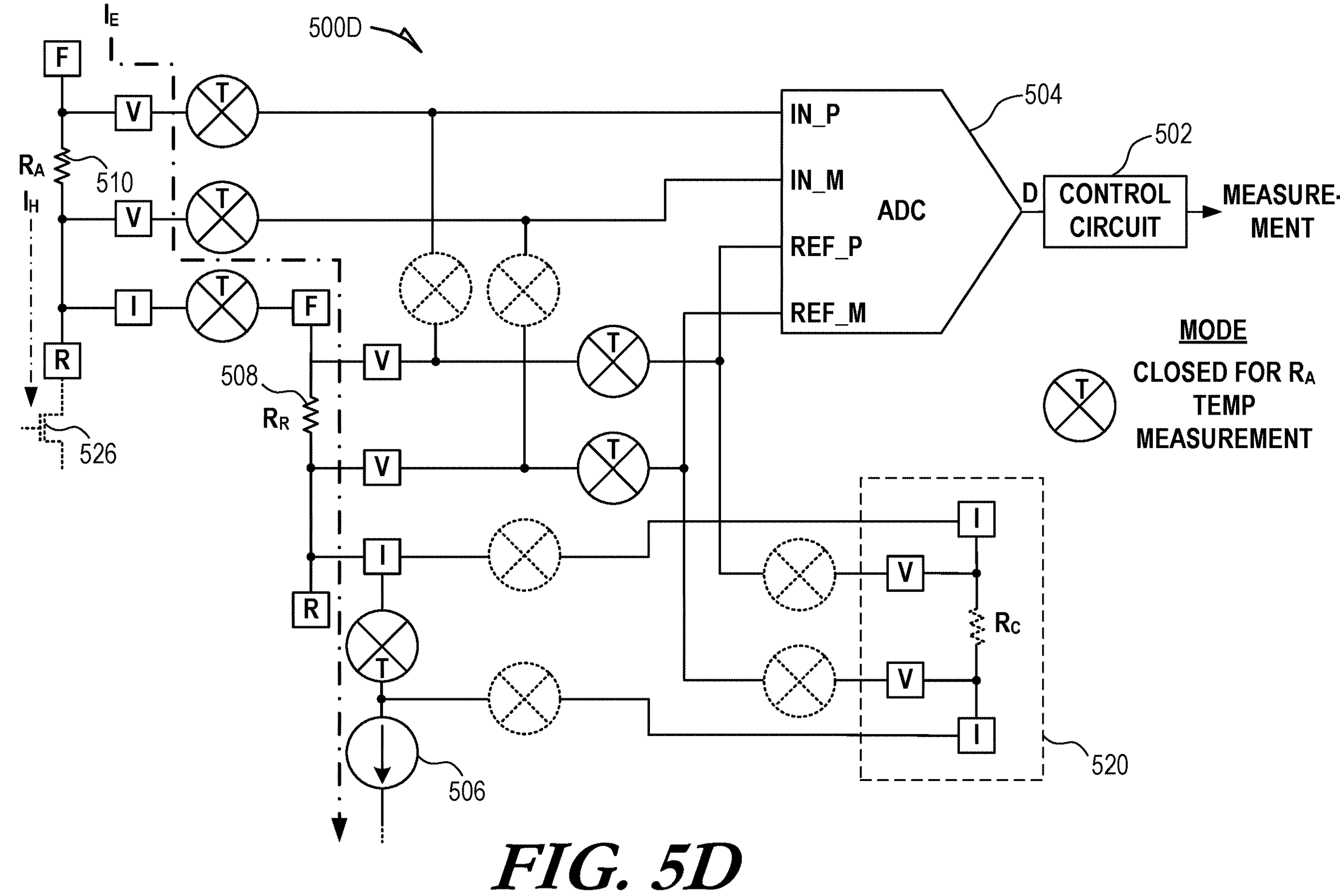
FIG. 5D illustrates generally an example comprising the electronic circuit of FIG. 5A configured in an $R_A$ temperature measurement mode.

The electronic circuit 500 of FIG. 5A can be used with a third resistive device, such as an off-chip resistor 520 represented by $R_C$ or corresponding module. The electronic circuit 500 of FIG. 5A supports performing ratio-metric measurements between any pair of the resistive elements, $R_A$, $R_R$, and $R_C$. Generally, two calibration operations can be performed to capture calibration coefficients corresponding to RR and RA (with switching configurations and operations as described below in FIG. 5B and FIG. 5C, respectively). After such calibration coefficients are established, a calibrated temperature measurement can be performed as shown in the switching configuration of FIG. 5D (without requiring the off-chip resistor 520). In the example of an array of resistive sensors as shown in FIG. 2, measurements in a normal temperature measurement mode as shown in FIG. 5D can be performed by respective ADC circuits (such as the ADC circuit 504 of FIG. 5D) in parallel with each other. In general, excitation current for the measurements performed in the respective operational modes shown in FIG. 5B, FIG. 5C, and FIG. 5D are provided by a current source 506, and such an excitation current can be routed to flow contemporaneously through at least two of the three resistive elements, $R_A$, $R_R$, and $R_C$, depending on the operational mode. Nodes labeled "V" in FIG. 5A through FIG. 5D refer to voltage measurement nodes (e.g., interconnect locations to voltage measurement circuitry such as the ADC circuit 504). Nodes labeled "I" indicate current injection nodes, where the voltage measurement nodes "V" are located in a manner to help suppress measurement error from interconnect resistance. Nodes labeled "F" and "R" refer to current feed and return locations, respectively. The node labels "V," "I," "F," and "R" are merely illustrative of potential configurations, though the routing of electrical nets in the schematic representations shown in FIG. 5A through FIG. 5D need not represent a physical layout.

Generally, in the analytical representations and measurement modes discussed below, the definitions shown in TABLE 2 are used:

TABLE 2

| Terms used in analytical representations related to calibration measurements. | | |
|---|---|---|
| Nominal temperature | | $T_0$ |
| Exposure temperature | | $T_1$ |
| Temperature deviation from nominal | | $\Delta T_1 = T_1 - T_0$ |
| Temperature coefficient of resistance (TCR) | | $\alpha$ |
| 2nd order TCR | | $\beta$ |
| Active sensor resistance | @ Nominal $T_0$ | $R_{a,0}$ |
| | @ Exposure $T_1$ | $R_{a,0}(1 + \alpha_a \Delta T_1 + \beta_a \Delta T_1^2)$ |
| On-chip Reference resistance: | @ Nominal $T_0$ | $R_{r,0}$ |
| | @ Exposure $T_1$ | $R_{r,0}(1 + \alpha_r \Delta T_1 + \beta_r \Delta T_1^2)$ |
| Off-chip reference resistance | | $R_{oc}$ @ all temperatures |

As an illustrative example, a second-order TCR is included to illustrate how the techniques described herein can be extended to higher-order temperature coefficients of resistance. In many practical applications, use of a first-order TCR will be sufficient to achieve a specified measurement accuracy or a specified consistency between respective sensors, or both. Accordingly, the calibration approach described herein can be used to determine at least first-order temperature coefficients of resistance for respective sensors or corresponding reference devices having similar materials or geometry (or both) to the respective sensors.

FIG. 5B illustrates generally an example comprising the electronic circuit 500 of FIG. 5A configured in an $R_R$ calibration mode to provide a circuit configuration 500B, such as can include use of an off-chip reference resistor 520. Multiplexer switches that are opened are shown as dotted, with the remaining switches closed, showing the letter "R." In the example of FIG. 5B, the reference device 508 can be exposed to a known temperature $T_1$ (for example, set by an oven or other technique, or by having a method to measure the ambient $T_1$ and corresponding die temperature accurately through a separate measurement. A measurement process similar to the process at 425 to 440 in FIG. 4 can be performed, such as routing an excitation current IE as shown by the dashed line and resulting digital representations from the ADC circuit 504 can be used by the control circuit 502 or other processing circuitry. An output of the ADC circuit 504 for a respective measurement can be represented as:

$$D = \frac{R_{r,0}}{R_{OC}}\left(1 + \alpha_r \Delta T_1 + \beta_r \Delta T_1^2\right) \quad \text{EQN. 2}$$

The output D, of the ADC circuit can be used to extract calibration coefficients $R_{r,0}$, $\alpha_r$, and $\beta_r$, which can be stored and used for measurements in the mode corresponding to FIG. 5D. A similar approach can be used for each reference device 508 where an integrated circuit includes multiple reference devices as shown illustratively in FIG. 2. Referring back to FIG. 5B, generally, one temperature can be used to extract a nominal resistance ($R_{r,0}$), two temperatures (corresponding to different "$T_1$" values) can be used to extract a first-order TCR, three temperatures for a second-order TCR, and so on. While not required, additional measurements beyond these can also help refine the accuracy of the TCR estimate, such as using a regression technique to extract the respective nominal resistances or other parameters such as TCRs.

FIG. 5C illustrates generally an example comprising the electronic circuit 500 of FIG. 5A configured in an $R_A$ calibration mode to provide a circuit configuration 500C, such as can include use of an off-chip reference resistor. As in FIG. 5B, multiplexer switches that are open are shown with dotted lines, with the remaining switches closed, showing the letter "A" in this example. In a manner similar to the approach shown in FIG. 5B, in the configuration 500C, the active resistive temperature sensor 510 can be exposed to a known temperature $T_1$ and calibrated against a known resistance of the off-chip resistor 520. The measurements performed in FIG. 5C can be similar to those shown in the process at 405 to 420 in FIG. 4, as an illustration. The coefficients $R_{a,0}$, $\alpha_a$, and $\beta_a$ can be extracted and stored for use during "normal" temperature measurement operations such as corresponding to FIG. 5D. In the example of FIG. 5C, an output of the ADC circuit 504 for a respective measurement can be represented as:

$$D = \frac{R_{a,0}}{R_{OC}}\left(1 + \alpha_a \Delta T_1 + \beta_a \Delta T_1^2\right) \quad \text{EQN. 3}$$

FIG. 5D illustrates generally an example comprising the electronic circuit 500 of FIG. 5A configured in an $R_A$ temperature measurement mode to provide the circuit configuration 500D. As in FIG. 5B and FIG. 5C, multiplexer switches that are open are shown with dotted lines, with the remaining switches closed, showing the letter "T" in this example. The off-chip resistor 520 is not required for the operational mode shown in FIG. 5D. In this mode, the active resistive temperature sensor 510 can be exposed to an unknown temperature $T_2$, which can be determined using the calibration parameters established in the modes shown in FIG. 5B and FIG. 5C, respectively.

In the example of the circuit configuration 500D, a respective on-die reference device 508 is used in combination with the active resistive temperature sensor 510, in a manner similar to the ratio-metric measurement approach shown in FIG. 3 and electronic circuit 100 of FIG. 1. Measurements using the circuit configuration 500D can be performed at a higher rate as compared to FIG. 5B or FIG. 5C, such as for measuring temperatures at different on-die sites in an array where respective sites have a corresponding active resistive temperature sensor 510, and where multiple reference devices are available to be shared by groups of active resistive temperature sensors. Generally, a physical location of the reference device 508 can be sufficiently far from the site of the active resistive temperature sensor 510 such that the reference device 508 can be at a fixed or otherwise known temperature corresponding to a bulk of the of the integrated circuit substrate (e.g., $T_1$). A temperature difference $\Delta T_2$ between the active resistive temperature sensor 510 and the reference device 508 can be determined using an output D of the ADC circuit 504 and the calibration coefficients for both the active and reference devices (e.g., the active resistive temperature sensor 510 and the reference device 508), such as according to the analytical expression below:

$$D = \frac{R_{a,0}}{R_{r,0}} \frac{\left(1 + \alpha_a \Delta T_2 + \beta_a \Delta T_2^2\right)}{\left(1 + \alpha_r \Delta T_1 + \beta_r \Delta T_1^2\right)} \quad \text{EQN. 4}$$

For a first order TCR model, where the β terms are omitted (or zeroed out), the $\Delta T_2$ values can be obtained directly by linear solution. If the second order model is used, the $\Delta T_2$ can be extracted quadratically, and for higher order models, other techniques such as regression analysis can be used to extract an estimate of $\Delta T_2$. Other aspects of the present subject matter can include offset calibration, aging compensation, or absolute $T_2$ temperature determination (as compared to $\Delta T_2$ temperature difference determination), as discussed below.

Active-to-On-Chip-Reference Pair Offset calibration: generally, the resistive temperature sensors described in this document can be fabricated in manner where a similar physical configuration and a similar composition of materials can be used for the respective sensors and corresponding on-chip reference devices. Accordingly, to an approximation, the corresponding first order and second order TCR coefficients (e.g., α and β coefficients) can be assumed to be similar across multiple devices. Accordingly, a ratio-metric measurement can be performed at a single temperature of the active resistive sensors versus reference resistor, and an "offset" term $R_{a,0}/R_{r,0}$ can be determined and used for other operations. Such an approach might reduce an impact of measurement noise in calculating the "offset" value on other calibration operations mentioned above.

Aging: to the extent that the active resistive temperature sensors exhibit "aging" phenomena after fabrication which cause their respective $R_{a,0}$ values to drift over time, it is expected that the reference devices (which can be nearly identical in construction) may undergo similar (e.g., proportional or matching) aging drift in $R_{r,0}$. Because the techniques herein use a relative indication such as a measurement involving a ratio of resistance values, drift which appears common to the resistor structures will be cancelled by the measurement. The above-mentioned offset calibration approach can also be applied to reject any differential drift that occurred between the resistive sensors or corresponding reference devices since an initial or prior calibration.

Regarding the off-chip resistor 520, a value of the off-chip reference resistor is not critical but can be selected to be substantially the same as that of the active resistive temperature sensor 510 and the reference device 508. During the calibration processes, voltages induced across each of the resistive devices will then be nearly equal, delivering enhanced sensitivity to the resistance ratio in the measurement. For an array of resistive temperature sensors as shown in FIG. 2, as few as a single off-chip resistor can be used to calibrate (in sequence) an arbitrary number of on-chip resistive devices, such as for supporting measurements involving a large array of reaction sites. The calibration of such an ensemble can involve many respective measurements (such as including replicates and measurement averaging to filter measurement noise and deliver a more precise estimate of calibration coefficients). But, for example, a time duration for an oven to settle properly for each evaluation temperature during calibration (such as where at least two known temperatures are used to estimate a first order TCR), will generally be longer than the duration of time consumed in performing the corresponding calibration measurements. Generally, thermal settling time may constrain a speed of calibration during manufacturing calibration or subsequent calibration operations. Generally, once the calibration data have been established for all on-chip resistive devices, then $\Delta T_2$ measurements for a large ensemble of active resistors (versus their corresponding reference resistors) can be measured contemporaneously, where there are multiple ADC circuits and corresponding multiplexing circuitry (as shown illustratively in the configuration of the system 200 of FIG. 2).

If a near-zero TCR off-chip resistor 520 is used, a determination of the integrated circuit temperature can be made. For example, referring back to the circuit configuration 500B of FIG. 5B, and assuming that calibration data have already been established, a measurement as shown in the circuit configuration 500B of FIG. 5B can be made of the reference device 508 relative to the off-chip resistor 520, and an analytical form similar to EQN. 2 can be used to solve for the temperature of the reference device 508, $T_1$. Then, using the $\Delta T_2$ from a measurement using the circuit configuration 500D of FIG. 5D, $T_2$ can be determined by adding the $\Delta T_2$ to $T_1$. In this manner, an absolute determination of $T_2$ can be performed. Alternatively, a measurement can be performed using the circuit configuration 500C of FIG. 5C to obtain a relative indication of temperature between the "active" thermometer and the off-chip resistor, followed by applying the previously obtained calibration data to convert this measurement to an absolute temperature measurement of the active thermometer. But such an approach may limit measurement speed if there are many respective resistive temperature sensors like the active resistive temperature sensor 510 and few (or only a single) off-chip resistor 520. By measuring the $\Delta T_2$ value relative to the reference device 508, where there are more corresponding reference devices (e.g., one per column of active temperature sensors as shown in FIG. 2), the measurement throughput can be enhanced versus directly measuring the $T_2$ value of the active resistive temperature sensor 510 using the off-chip resistor 520, because there can be multiple reference devices on-chip shared by several temperature sensors. In yet another example, if an integrated circuit substrate temperature can be assumed to be roughly constant across all the reference device locations, as few as a single measurement can be performed to determine the $T_1$ value for a respective one of the reference devices and then assumed to be value for all reference devices.

VARIOUS NOTES

Each of the non-limiting aspects above can stand on its own or can be combined in various permutations or combinations with one or more of the other aspects or other subject matter described in this document.

The above detailed description includes references to the accompanying drawings, which form a part of the detailed description. The drawings show, by way of illustration, specific embodiments in which the invention can be practiced. These embodiments are also referred to generally as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc., are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Such instructions can be read and executed by one or more processors to enable performance of operations comprising a method, for example. The instructions are in any suitable form, such as but not limited to source code, compiled code, interpreted code, executable code, static code, dynamic code, and the like.

Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A method for localized measurement of temperature using an integrated temperature sensor circuit, the method comprising:

generating an excitation current;

using switching circuitry, routing the excitation current through a first resistive temperature sensor to establish a first sensor signal and, contemporaneously, routing the excitation current through a second resistive temperature sensor to establish a second sensor signal;

comparing the first sensor signal and the second sensor signal to establish a relative indication of the first sensor signal with respect to the second sensor signal; and in response, generating a digital representation of the relative indication of the first sensor signal with respect to the second sensor signal;

wherein the first resistive temperature sensor and second resistive temperature sensors are monolithically co-integrated upon or within a commonly shared substrate, the second resistive temperature sensor having a location that is separated from the first resistive temperature sensor.

2. The method of claim 1, comprising determining a measured temperature value corresponding to the first resistive temperature sensor using calibration data indicative of a ratio of resistance values of the first resistive temperature sensor and the second resistive temperature sensor, and at least first-order temperature coefficients of resistance corresponding to the first resistive temperature sensor and the second resistive temperature sensor, respectively.

3. The method of claim 2, wherein establishing the at least first-order temperature coefficients of resistance corresponding to the first resistive temperature sensor and the second resistive temperature sensor comprises:

for at least two or more known temperatures, routing a calibration excitation current through the first resistive temperature sensor when the first resistive temperature sensor is at a respective one of the at least two or more known temperatures and, contemporaneously, routing the calibration excitation current through an off-chip reference resistor having a specified or measured resistance value;

comparing respective first sensor signals corresponding to the at least two or more known temperatures with voltages established across the off-chip reference resistor to establish relative indications of the respective first sensor signals with respect to voltages established across the off-chip reference resistor; and in response, generating digital representations of the relative indications of the respective first sensor signals with respect to voltages established across the off-chip reference resistor.

4. The method of claim 3, wherein establishing the at least first-order temperature coefficients of resistance corresponding to the first resistive temperature sensor and the second resistive temperature sensor comprises:

for at least two or more known temperatures, routing the calibration excitation current through the second resistive temperature sensor when the second resistive temperature sensor is at a respective one of the at least two or more known temperatures and, contemporaneously, routing the calibration excitation current through the off-chip reference resistor having the specified or measured resistance value;

comparing respective second sensor signals corresponding to the at least two or more known temperatures with voltages established across the off-chip reference resistor to establish relative indications of the respective second sensor signals with respect to voltages established across the off-chip reference resistor; and in response, generating digital representations of the relative indications of the respective second sensor signals with respect to voltages established across the off-chip reference resistor.

5. The method of claim 4, comprising:

determining nominal resistance values of the first resistive temperature sensor and the second resistive temperature sensor or an offset value corresponding thereto using the digital representations of the relative indications of the respective first sensor signals and the respective second sensor signals with respect to corresponding voltages established across the off-chip reference resistor; and determining the at least first-order temperature coefficients of resistance corresponding to the first resistive temperature sensor and the second resistive temperature sensor using the digital representations.

6. The method of claim 5, wherein the determining the nominal resistance values and the at least first-order temperature coefficients comprises performing a regression technique.

7. The method of claim 6, wherein the determining the nominal resistance values and the at least first-order temperature coefficients comprises:

determining higher-order temperature coefficients using a higher count of known temperatures and corresponding voltage comparisons; and applying the regression technique to corresponding generated digital representations of the corresponding voltage comparisons.

8. The method of claim 5, wherein the determining the measured temperature value corresponding to the first resistive temperature sensor comprises:

routing the excitation current through the second resistive temperature sensor and, contemporaneously, routing the excitation current through the off-chip reference resistor;

comparing a second sensor signal with a voltage established across the off-chip reference resistor to establish a relative indication of the second sensor signal with respect to the voltage established across the off-chip reference resistor;

generating a corresponding digital representation of the relative indication of the second sensor signal with respect to the voltage established across the off-chip reference resistor;

determining an absolute temperature of the second resistive temperature sensor using the at least first-order temperature coefficients of resistance corresponding the second resistive temperature sensor using the digital representations;

determining a difference in temperature between the first resistive temperature sensor and the second resistive temperature sensor using the digital representation of the relative indication of the first sensor signal with respect to the second sensor signal using the at least first-order temperature coefficients of resistance corresponding to the first resistive temperature sensor and the second resistive temperature sensor; and determining an absolute temperature of the first resistive temperature sensor using the determined absolute temperature of the second resistive temperature sensor and the determined difference in temperature between the first resistive temperature sensor and the second resistive temperature sensor.

9. The method of claim 8, wherein the off-chip reference resistor is exposed to a controlled temperature or a known temperature.

10. The method of claim 1, wherein the relative indication comprises a ratio.

11. The method of claim 1, wherein a composition and a structure of the first resistive temperature sensor and the second resistive temperature sensor are substantially similar or identical.

12. An integrated circuit, comprising:

an excitation current source;

a first resistive temperature sensor;

a second resistive temperature sensor;

measurement switching circuitry;

an analog-to-digital converter (ADC) circuit; and a control circuit, the control circuit configured to:

using the measurement switching circuitry, route an excitation current from the excitation current source through the first resistive temperature sensor to establish a first sensor signal and, contemporaneously, route the excitation current through the second resistive temperature sensor to establish a second sensor signal;

using the measurement switching circuitry, deliver the first sensor signal to a first input of the ADC circuit;

using the measurement switching circuitry, deliver the second sensor signal to a second input of the ADC circuit; and generate a digital representation of a relative indication of the first sensor signal with respect to the second sensor signal using the ADC circuit;

wherein the first resistive temperature sensor and second resistive temperature sensors are monolithically co-integrated on or within a commonly shared substrate of the integrated circuit, the second resistive temperature sensor having a temperature that is different from the first resistive temperature sensor.

13. The integrated circuit of claim 12, wherein a composition and a structure of the first resistive temperature sensor and the second resistive temperature sensor are substantially similar or identical.

14. The integrated circuit of claim 13, wherein the first resistive temperature sensor is included in an array comprising a plurality of resistive temperature sensors.

15. The integrated circuit of claim 14, wherein the second resistive temperature sensor comprises a reference resistive temperature sensor separate from the array.

16. The integrated circuit of claim 14, wherein the measurement switching circuitry comprises a multiplexer circuit configured to address a selected one of the plurality of resistive temperature sensors for performing a temperature measurement in response to the control circuit.

17. The integrated circuit of claim 12, comprising a calibration resistor port, the calibration resistor port defining nodes for interconnection with an off-chip calibration resistor;

wherein the control circuit is configured to determine a measured temperature value corresponding to the first resistive temperature sensor using calibration data indicative of a ratio of resistance values of the first resistive temperature sensor and the second resistive temperature sensor, and at least first-order temperature coefficients of resistance corresponding to the first resistive temperature sensor and the second resistive temperature sensor, respectively, the calibration data established using the off-chip calibration resistor.

18. The integrated circuit of claim 17, wherein the control circuit is configured to determine the measured temperature value corresponding to the first resistive temperature sensor using a determined absolute temperature of the second resistive temperature sensor, a difference in temperature between the first resistive temperature sensor and the second resistive temperature sensor, and the at least first-order temperature coefficients of resistance corresponding to the first resistive temperature sensor and the second resistive temperature sensor.

19. The integrated circuit of claim 18, wherein the control circuit is configured to determine the absolute temperature of the second resistive temperature sensor based on the off-chip calibration resistor being exposed to a controlled temperature or being at a known temperature.

20. An integrated circuit, comprising:

an excitation current source;

a first resistive temperature sensor;

a second resistive temperature sensor;

measurement switching circuitry;

an analog-to-digital converter (ADC) circuit; and a control circuit, the control circuit configured to determine a measured temperature value corresponding to the first resistive temperature sensor using:

digital representations of respective voltages established contemporaneously across the first resistive temperature sensor and the second resistive temperature sensor in response to an excitation current provided by the excitation current source, the digital representations obtained using the ADC circuit; and calibration data indicative of a ratio of resistance values of the first resistive temperature sensor and the second resistive temperature sensor, and at least first-order temperature coefficients of resistance corresponding to the first resistive temperature sensor and the second resistive temperature sensor, respectively.

* * * * *